US008799065B2

(12) United States Patent
Reuthe et al.

(10) Patent No.: US 8,799,065 B2
(45) Date of Patent: Aug. 5, 2014

(54) METHODS FOR PROVIDING DIGITAL INCENTIVES INCLUDING A DIGITAL INCENTIVES SWITCH FOR MATCHING TRANSACTIONS AND INCENTIVES

(75) Inventors: Eric Reuthe, Franklin, TN (US); Jonathan Dyke, Washington, DC (US)

(73) Assignee: edo Interactive, Inc., Nashville, TN (US)

( * ) Notice: Subject to any disclaimer, the term of this patent is extended or adjusted under 35 U.S.C. 154(b) by 545 days.

(21) Appl. No.: 12/630,446

(22) Filed: Dec. 3, 2009

(65) Prior Publication Data

US 2011/0137716 A1 Jun. 9, 2011

(51) Int. Cl.
*G06Q 30/00* (2012.01)
(52) U.S. Cl.
USPC .................. 705/14.17; 705/14.25; 705/14.34; 705/14.38
(58) Field of Classification Search
None
See application file for complete search history.

(56) References Cited

U.S. PATENT DOCUMENTS

| 4,723,212 | A | 2/1988 | Mindrum |
| 5,025,372 | A | 6/1991 | Burton et al. |
| 5,649,114 | A | 7/1997 | Deaton et al. |
| 6,076,068 | A | 6/2000 | DeLapa et al. |
| 7,506,804 | B2 | 3/2009 | Zajkowski et al. |
| 2002/0026348 | A1 | 2/2002 | Fowler et al. |
| 2003/0028518 | A1* | 2/2003 | Mankoff ............................ 707/1 |
| 2003/0154163 | A1* | 8/2003 | Phillips et al. ................... 705/39 |
| 2003/0158818 | A1 | 8/2003 | George et al. |
| 2005/0240477 | A1 | 10/2005 | Friday et al. |
| 2006/0027647 | A1* | 2/2006 | Deane et al. ................... 235/380 |
| 2006/0053056 | A1* | 3/2006 | Alspach-Goss et al. ........ 705/14 |
| 2007/0033098 | A1* | 2/2007 | Peters et al. ..................... 705/14 |
| 2007/0226055 | A1* | 9/2007 | Belanger et al. ................ 705/14 |
| 2008/0103968 | A1 | 5/2008 | Bies et al. |
| 2008/0133351 | A1* | 6/2008 | White et al. ..................... 705/14 |
| 2008/0235091 | A1 | 9/2008 | Holliday |
| 2009/0012862 | A1 | 1/2009 | Pirillo et al. |
| 2009/0030793 | A1 | 1/2009 | Fordyce |
| 2009/0112639 | A1* | 4/2009 | Robinson Beaver ............. 705/5 |

* cited by examiner

*Primary Examiner* — John G Weiss
*Assistant Examiner* — Vincent Cao
(74) *Attorney, Agent, or Firm* — McDermott, Will & Emery LLP

(57) ABSTRACT

Systems and methods for providing digital incentives or financial offsets including the steps of: providing a financial platform operable on a server computer and at least one database in electronic, digital communication over a network, the financial platform operable for financial services transactions; providing a database of profile data for the at least one user; developing a digital incentive program for stimulating financial transactions by at least one user, the digital incentive program including profile factors from the profile data of the at least one user; automatically providing at least one digital incentive to corresponding of the at least one user, the at least one digital incentive available for a redemption by each of the users, wherein the digital incentive has an electronic financial transaction value available for the redemption on any electronic financial transaction media, and wherein the redemption of the electronic financial transaction value of the digital incentive does not occur at a merchant level of the financial transactions.

19 Claims, 5 Drawing Sheets

METHODS FOR PROVIDING DIGITAL INCENTIVES INCLUDING A DIGITAL INCENTIVES SWITCH FOR MATCHING TRANSACTIONS AND INCENTIVES

BACKGROUND OF THE INVENTION

1. Field of the Invention

The present invention relates generally to financial systems and methods. Further, the present invention relates to digital incentives for electronic financial transactions and systems and methods relating thereto.

2. Description of the Prior Art

Merchants and service providers often utilize various forms of incentives to attract new customers and to gain repeat business with prior customers. These incentives generally range from traditional paper coupons to rewards programs that incentivize customer loyalty by awarding customers reward currency for qualifying transactions and allowing customers to redeem accumulated reward currency for discounts, merchandise, or other benefits.

Merchants and manufacturers have long used paper coupons to provide potential customers with incentives to patronize a specific store or to purchase particular products or services. Paper coupons are often delivered through the mail, newspapers, store flyers, and printers located at checkout counters. More recently, email and websites have also been used to deliver coupons for printing. In addition, online merchants regularly provide online coupons, known as coupon codes, for use at the checkout phase of an online purchase. Furthermore, some merchants now send coupons directly to consumers' mobile phones as text messages. Finally, some merchants utilize closed-loop loyalty card systems in which customers are provided loyalty cards associated with loyalty accounts and the merchants can automatically deliver coupons to the associated accounts.

Coupons, in all forms, allow merchants to provide incentives to potential customers. For customers, coupons provide a benefit at the time of purchase, not at some later time, as is typically the case with rewards programs based on reward currency accumulation. However, coupons have several disadvantages. Paper coupons require that the consumer manually collect the coupons, remember to bring the coupons to the appropriate store, and to manually present the coupons at the time of purchase. Also, avoiding coupon fraud for electronic coupons is a problem for prior art electronic coupons. In addition, paper coupons require merchants to train employees to process the coupons. While coupons delivered automatically to mobile phones and closed-loop loyalty accounts reduce the effort required to collect coupons, consumers are still required to bring their mobile phones or closed-loop loyalty cards to the store in addition to a form of payment in order to receive the benefit of the coupon.

Relevant prior art related to coupons includes the following:

U.S. Pat. No. 4,723,212 entitled "Method and Apparatus for Dispensing Discount Coupons" and issued Feb. 2, 1988, to Mindrum et al. discloses an "apparatus, and a corresponding method, for creating a discount coupon in response to the purchase of a product other than the one to which the coupon applies."

U.S. Pat. No. 5,649,114 entitled "Method and System for Selective Incentive Point-of-Sale Marketing in Response to Customer Shopping Histories" and issued Jul. 15, 1997, to Deaton et al. discloses entering a customer's identification code, along with customer transaction data, at the point-of-sale, a memory that stores a database of previously entered customer identification codes and transactions data, and a circuitry for generating a signal representative of a customer's shopping history, wherein incentive coupons may be issued to customers in dependence upon the signal.

U.S. Pat. No. 6,076,068 entitled "Coupon Delivery System" and issued Jun. 13, 2000, to DeLapa et al. discloses a "computer-implemented method and apparatus for generating coupons to provide discounts for purchases [which] includes providing a computer-based kiosk at a retail establishment such as a grocery store."

Prepaid cards are a second form of incentive utilized by merchants. Prepaid cards are debit cards generally purchased by a consumer for later use and are often required to be used at a specific merchant or set of merchants. Consequently, prepaid cards allow merchants to receive money prior to providing any merchandise or service. Once a prepaid card has been purchased, it provides an incentive for the consumer to use it since the expenditure of money has already been made in advance. However, since the prepaid cards generally require consumers to spend money at a time before they receive any goods or services, there is little incentive to purchase a prepaid card outside of a special context, such as gift giving or fundraising. Therefore, prepaid cards often provide little actual incentive for a consumer to patronize a particular merchant or service provider.

In addition to offering prepaid cards for purchase, some merchants use prepaid cards as a method to distribute rewards from their respective customer loyalty and rewards programs. While the prospect of receiving a prepaid card upon achievement of a preset requirement of a loyalty and rewards program provides customer incentive, the benefit to the customer is delayed until a point in time after the time of purchase. This delay is in direct contrast to a coupon-type incentive, which benefits a customer immediately at the point of sale.

Relevant prior art related to prepaid cards include the following: http://www.parago.com/prepaidcards Loyalty and rewards programs are popular incentive tools used by merchants and service providers. These programs generally reward customer loyalty by crediting a consumer's rewards account with a reward currency—points, miles, reward dollars, etc.—upon the completion of a qualifying transaction and allowing the consumer to redeem accumulated reward currency for merchandise, services, or discounts. Some loyalty and reward program implementations provide rebates or discounts to the consumer based on the achievement of preset milestones. In general, loyalty and reward programs reward a pattern of customer loyalty performed in the past with a future reward. While these programs provide an incentive for consumers, the consumers must wait until a point in time after one or more purchases have been made before realizing any program-related benefit. Consumers do not receive any immediate benefit at the point of sale as they would with coupon-type incentives.

Traditional implementations of loyalty and rewards programs often issue a separate rewards card to be scanned or swiped at the time of sale in order to credit the rewards account of the customer. Consequently, the consumer is required to carry an additional device to take advantage of the rewards program. In other implementations, merchants partner with banks or credit card companies to issue credit or debit cards with a second magnetic strip. At the time of purchase, a store clerk swipes the card once through a card reader to initiate payment and then performs a second swipe to credit the customer's rewards account. This latter implementation carries with it the disadvantage of requiring store clerks to be trained to perform additional tasks and, depending on the implementation, requiring the merchant to have additional equipment. Other implementations have resolved these issues in the loyalty and rewards context by allowing a single swipe of an individual credit/debit card to initiate payment, credit rewards accounts, and to redeem awards previously earned.

Relevant prior art related to loyalty and reward programs include the following:

U.S. Published Patent Application No. 20090030793 entitled "Multi-Vendor Multi-Loyalty Currency Program" and published Jan. 29, 2009, to Fordyce discloses that "in addition to obtaining payment for the merchant from the account via an acquirer and an issuer, respectively, a transaction handler tabulates and stores, different types of loyalty currencies in a loyalty reward account associated with the account holder if the account holder is enrolled in a loyalty program and criteria for applying the loyalty program are satisfied."

U.S. Published Patent Application No. 20050240477 entitled "Cardholder Loyalty Program with Rebate" and published Oct. 27, 2005, to Friday et al. discloses a system and method for implementing a program such as a loyalty program. An account (e.g., card) system includes a plurality of participating account holders (e.g., cardholders), a plurality of non-participating account holders (e.g., cardholders), a plurality of non-preferred merchants and a plurality of preferred merchants. A processor executes the program including evaluating transactions to identify qualifying transactions involving both a participating account holders (e.g., cardholders) and a preferred merchant. Rebates are provided for identified, qualifying transactions.

U.S. Pat. No. 5,025,372 entitled "System and Method for Administration of Incentive Award Program Through Use of Credit" and issued Jun. 18, 1991, to Burton et al. discloses "computer data processing, programming and printing for an improved incentive award program which allocates monetary amounts available for expenditure through credit instruments issued to program participants when the participants perform to a designated level of achievement."

U.S. Published Patent Application No. 20020026348 entitled "Marketing Systems and Methods" and published Feb. 28, 2002, to Fowler et al. discloses "systems and methods implementing a plurality of marketing programs, offered by a plurality of merchants or merchant groups, upon presentation of a qualifying identifier, such as a (single) transaction card. Yet another aspect of the present invention provides methods and systems enabling a "single-swipe" transaction, wherein data is selectively packeted and transmitted to one or more institutions following a single electronic reading of a transaction card."

Note that marketing programs of the prior art are implemented using a host controller that communicates with a plurality of remote transaction systems to provide real-time, individualized, automated awards and sophisticated multi-variable analysis of transaction data."

U.S. Published Patent Application No. 20080103968 entitled "Redemption of Credit Card Rewards at Point of Sale" and published May 1, 2008, to Bies et al. discloses "systems and methods . . . for redeeming rewards at a merchant's point-of-sale. The reward redemption takes place in real time and can be accomplished without the active participation of the merchant. A single credit card with no additional information may be used with a single swipe from the consumer to access both credit and rewards accounts, such that a single authorization request is made to encompass both rewards and credit."

U.S. Published Patent Application No. 20060053056 entitled "Card Member Discount System and Method" and published Mar. 9, 2006, to Alspach-Goss et al. discloses a "method and apparatus to facilitate giving a discount to a consumer subsequent to a point of sale purchase . . . if the purchase qualifies for a discount under one or more discount programs, the consumer's financial account is charged the full, agreed upon purchase price, and subsequently credited one or more discounts the transaction qualifies for without the consumer needing to perform a secondary task(s)."

U.S. Published Patent Application No. 20080235091 entitled "Cash in Advance Incentive and Reward Program" and published Sep. 25, 2008, to Holiday discloses a system wherein "consumers are provided with a reward card in advance of earning the reward through online purchases."

Note that under the prior art systems consumers must complete transactions before getting reward and then take additional steps proactively in order to receive a rebate; once a preset amount of money is spent a rebate check is issued.

U.S. Published Patent Application No. 20090012862 entitled "Instant Zero Inventory Fulfillment and Redemption System and Method" and published Jan. 8, 2009, to Pirillo et al. discloses an "instant fulfillment system [that] allows members of programs, such as an incentive, reward, affinity or loyalty program, to use an instant reward card to redeem currency or points stored in a database, for instant 'rebates' or 'discounts' at selected retailers."

U.S. Published Patent Application No. 20030158818 entitled "Systems and Methods for Operating Loyalty Programs" and published Aug. 21, 2003, to George et al. discloses "A loyalty system that may be integrated with a financial infrastructure . . . . Such a financial infrastructure may accommodate transactions involving participants in the loyalty program as well as transactions that do not involve participants in the loyalty program."

U.S. Pat. No. 7,506,804 entitled "System and Method for an Integrated Payment and Reward Card" and issued Mar. 24, 2009, to Zajkowski et al. discloses "an integrated rewards card [that] includes a credit card number associated with a credit account of a person, persons, entity or a business. The integrated rewards card also includes a debit card number. The debit card number is different then the credit card number. Purchases using the credit card number cause a reward balance on a reward account associated with the debit card number to be increased. Products or services can be purchased with the reward account using a point of sale device for the credit card number."

U.S. Published Patent Application No. 20060027647 entitled "System and Method for Redeeming Awards and Incentives" published Feb. 9, 2006, to Deane et al. discloses a "transaction card, including a substrate having a front face and a back face, a first magnetic stripe for storing data associated with a credit account, the first magnetic stripe being located along an edge of the back face, a second magnetic stripe for storing data associated with a rewards account, the second magnetic stripe being located along another edge of the back face, and account information located on the front face, the account information being associated with the credit account and the rewards account."

While the "single swipe" concept has been utilized in the context of accumulation-based loyalty and rewards programs, a similar solution has not been employed in the context of coupon-type incentives. Because of the need to continuously update reward currency balances with each customer transaction, the benefits of triggering payment and rewards currency accumulation or redemption with a "single swipe" of a single payment device are much more apparent for accumulation-based loyalty and rewards programs than for electronic coupon-type incentive programs, which do not require continuous accounting of reward currency balances upon each transaction with the merchant. Consequently, it is not obvious to apply the "single swipe" methodology to electronic coupon-type incentive program implementations.

In light of the foregoing, there is an apparent need for an incentive implementation that allows merchants to seamlessly deliver electronic coupon-type incentives to potential customers and allows customers to pay for purchases and automatically receive the benefit of the incentives at the time of sale through a "single swipe" of a single payment device.

SUMMARY OF THE INVENTION

One aspect of the present invention provides a method for providing digital incentives including the steps of: providing a financial platform operable on a server computer and at least one database in electronic, digital communication over a network, the financial platform operable for financial services transactions; database of profile data for the at least one user; providing a digital incentives switch for administering a digital incentive program for stimulating financial transactions by at least one user, the digital incentive program including profile factors for matching with the profile data of the at least one user; and the digital incentives switch automatically comparing the profile factors with the profile data for determining a match; if a match is confirmed, then automatically applying at least one digital incentive to a corresponding account of the at least one user, wherein the step of applying the digital incentive provides an electronic financial transaction value as a credit to the user account.

In preferred embodiments of the present invention, the digital incentive has an electronic financial transaction value available for a redemption on any electronic financial transaction media, and also preferably, the redemption of the electronic financial transaction value of the digital incentive does not occur at a merchant level of the financial transactions, since applying the digital incentive provides an electronic financial transaction value as a credit to the user account following its redemption, as by providing an electronic digital credit associated with a positive match by the digital incentives switch, with the credit applicable through any electronic financial transaction media.

A second aspect of the present invention is to provide a system for providing digital incentives including: a financial system operable on a server computer and at least one database in electronic, digital communication over a network, the financial platform operable for financial services transactions; the financial system interacting with a database of profile data for a multiplicity of users; a digital incentive program operable within the financial system and the server computer for stimulating financial transactions by the users, the digital incentive program including profile factors from the profile data of the users and automatically providing at least one digital incentive to corresponding users, the at least one digital incentive available for a use by each of the users, wherein the digital incentive has an electronic financial transaction value available for the use on any electronic financial transaction media, and wherein the use of the electronic financial transaction value of the digital incentive does not alter the financial transactions for the merchant accepting payment for the transaction.

These and other aspects of the present invention will become apparent to those skilled in the art after a reading of the following description of the preferred embodiment when considered with the drawings, as they support the claimed invention.

DETAILED DESCRIPTION

Figure 1:
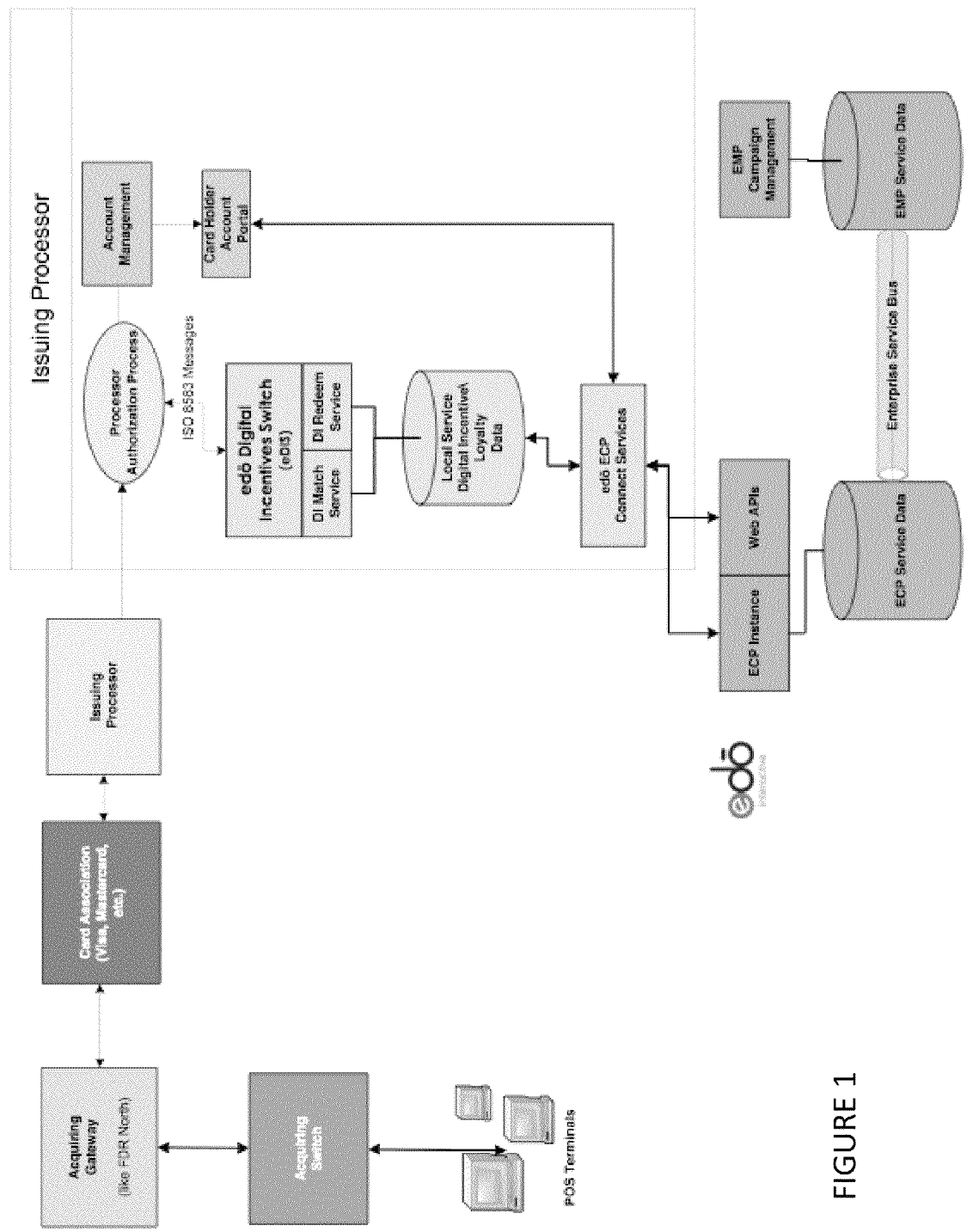
FIG. 1 illustrates a schematic diagram view of the system for providing digital incentives of the present invention.

The present invention provides a method for providing digital incentives including the steps of: providing a financial platform operable on a server computer and at least one database in electronic, digital communication over a network, the financial platform operable for financial services transactions; database of profile data for the at least one user; providing a digital incentives switch for administering a digital incentive program for stimulating financial transactions by at least one user, the digital incentive program including profile factors for matching with the profile data of the at least one user; and the digital incentives switch automatically comparing the profile factors with the profile data for determining a match; if a match is confirmed, then automatically applying at least one digital incentive to a corresponding account of the at least one user, wherein the step of applying the digital incentive provides an electronic financial transaction value as a credit to the user account.

In preferred embodiments of the present invention, the digital incentive has an electronic financial transaction value available for a redemption on any electronic financial transaction media, and also preferably, the redemption of the electronic financial transaction value of the digital incentive does not occur at a merchant level of the financial transactions, since applying the digital incentive provides an electronic financial transaction value as a credit to the user account following its redemption, for example by providing an electronic digital credit associated with a positive match by the digital incentives switch, the credit applicable through any electronic financial transaction media.

Also, the present invention provides a method for providing digital incentives or financial offsets including the steps of: providing a financial platform operable on a server computer and at least one database in electronic, digital communication over a network, the financial platform operable for financial services transactions; providing a database of profile data for the at least one user; developing a digital incentive program for stimulating financial transactions by at least one user, the digital incentive program including profile factors from the profile data of the at least one user; automatically providing at least one digital incentive to corresponding of the at least one user, the at least one digital incentive available for a redemption by each of the users, wherein the digital incentive has an electronic financial transaction value available for the redemption on any electronic financial transaction media, and wherein the redemption of the electronic financial transaction value of the digital incentive does not occur at a merchant level of the financial transactions, but instead provides an offset or credit to the user account(s) associated with the matched digital incentives.

The present invention also provides a system for providing digital incentives including a financial system operable on a server computer and at least one database in electronic, digital communication over a network, the financial platform operable for financial services transactions; the financial system interacting with a database of profile data for a multiplicity of users; a digital incentive program operable within the financial system and the server computer for stimulating financial transactions by the users, the digital incentive program including profile factors for matching with the profile data of the users and automatically providing at least one digital incentive to corresponding users, the at least one digital incentive available for a use by each of the users after a digital incentives processor confirms a match; the digital incentive has an electronic financial transaction value available for the use on any electronic financial transaction media. In preferred embodiments, the use or redemption or application of the electronic financial transaction value of the digital incentive does not occur at a merchant level of the financial transactions, rather, it is applied as a credit to the user account(s) following a match by the digital incentives switch at the processor level of the transaction.

In one embodiment of the present invention, the system includes a financial system operable (via software and/or applications directly or indirectly functioning) on a server computer having a processor, a memory, a power source, input/output devices, and at least one database in electronic, digital communication over a network, and connectable or accessible remotely through the network by at least one other remote computing device, which also has a processor, a memory, a power source, input/output devices, and constructed and configured for network-based digital communication over the network, wherein the financial platform is operable for automatically performing financial services transactions; the financial system interacting with a database of profile data for a multiplicity of users; a digital incentive program operable within the financial system and the server computer for stimulating financial transactions by the users, the digital incentive program including profile factors from the profile data of the users and automatically providing at least one digital incentive to corresponding users, the at least one digital incentive available for a use by each of the users, wherein the digital incentive has an electronic financial transaction value available for the use on any electronic financial transaction media, and wherein the use of the electronic financial transaction value of the digital incentive does not alter the financial transactions for the merchant accepting payment for the transaction.

Additionally, the present invention includes a computer readable code stored in a storage medium and executable by one or more processors, which when executed perform the method steps including: automatically providing an electronic communication for at least one digital incentive to a multiplicity of users, the at least one digital incentive available for a redemption by each of the users, applying an electronic financial transaction value available for application triggered by use of the at least one digital incentive by corresponding users, via an electronic financial transaction media; providing a credit for the electronic financial transaction value at a financial institution level for the account, demand deposit account, credit, debit, or prepaid account of the at least one user, without directly affecting a merchant level of the financial transaction.

Referring now to the drawings in general, the illustrations are for the purpose of describing preferred embodiments of the invention and are not intended to limit the invention thereto. FIG. 1 illustrates a schematic diagram view of the system for providing digital incentives of the present invention, wherein the digital incentives switch (DIS) is associated with, configured and connected for electronic communication with an issuing processor system. Merchant transactions are initiated at point of sale (POS) terminals, either on location of a merchant or service provider, such as a payment register computer, or online, via a website providing for commercial transactions for goods and/or services order and payment, wherein the website is accessed remotely via a user at a remote computer in electronic communication with a network, such as the Internet, to access the interactive website for input/output of information relating to the transaction through a graphic user interface on the remote computer. The POS terminals automatically communicate electronically via a network with an acquiring switch and an acquiring gateway, and then a card association function and issuing processor system, as illustrated.

Figure 2:
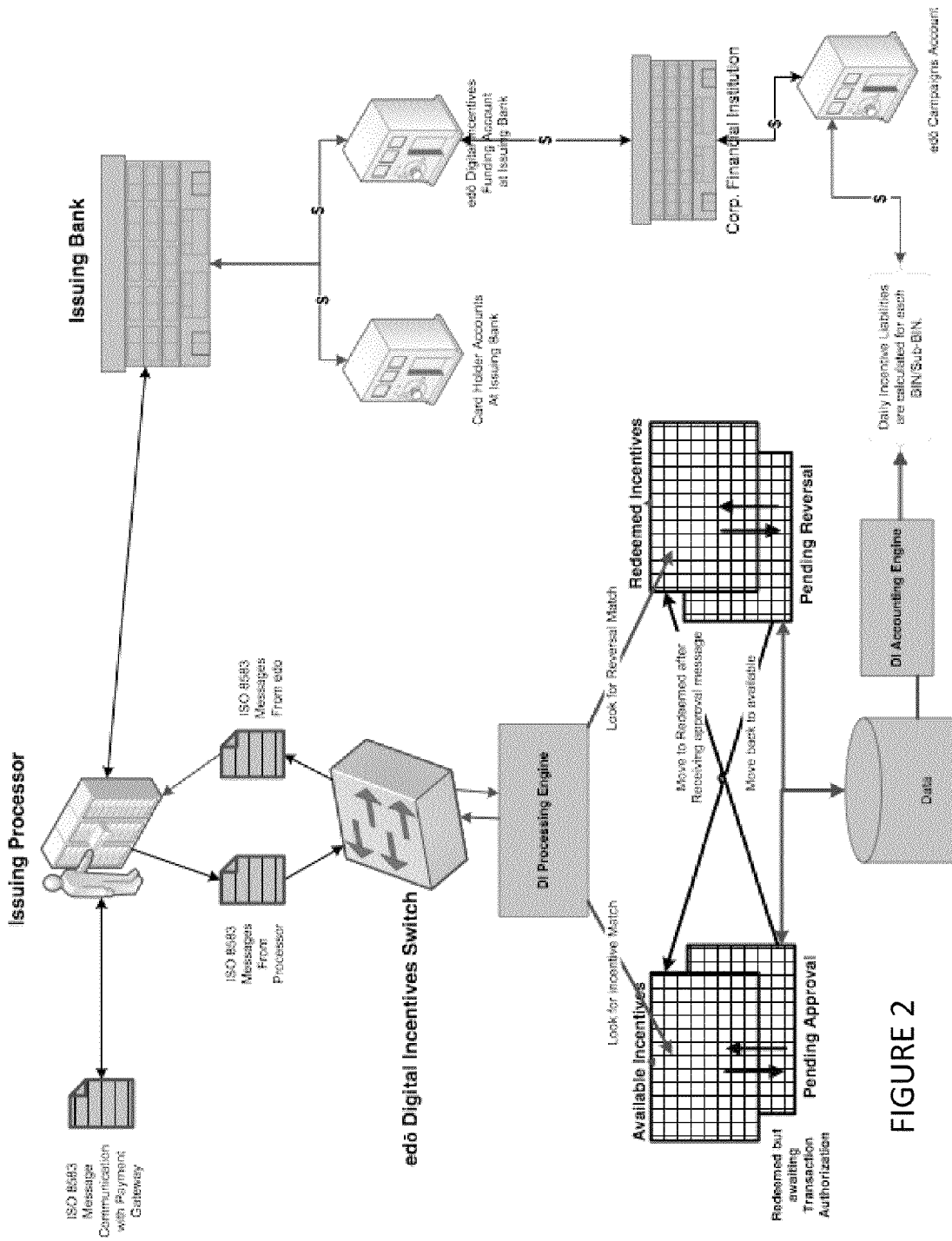
FIG. 2 illustrates a schematic flow diagram of the system and methods for providing digital incentives of the present invention.

FIG. 2 illustrates a schematic flow diagram of the system and methods for providing digital incentives of the present invention, showing an issuing processor in communication with the digital incentives switch connected to a processing engine, wherein the processing engine is a computer having a processor, memory, power, input/output, and in electronic connection and communication via a network for access to a database having data relating to the digital incentives, including available incentives and redeemed incentives for each account and/or corresponding user. Also, the issuing processor is in networked electronic communication with an issuing bank, having issuing bank account information and data for each card holder(s) or user(s), corresponding cards, corresponding bank accounts. The issuing processor is also at least indirectly connected via networked electronic communication with a digital incentives account that provides for offset (s) to the relevant accounts for which the digital incentives are properly redeemed and matched by the digital incentives switch. The digital incentives switch sends and receives messages from the issuing processor systems, based upon information and/or communication electronically received via a network by the issuing processor from the payment gateway (s) relating to payment and/or approval for transactions proposed by the payment gateway(s) for transactions, typically relating to the purchase of goods and/or services (at a merchant level, also referred to as merchant transactions). The digital incentives switch is operable with the digital incentive (DI) processing engine to identify an available incentive that may be redeemed in association with a matching transaction, based on the information provided by the issuing processor about the proposed transaction by the payment gateway(s).

Figure 3:
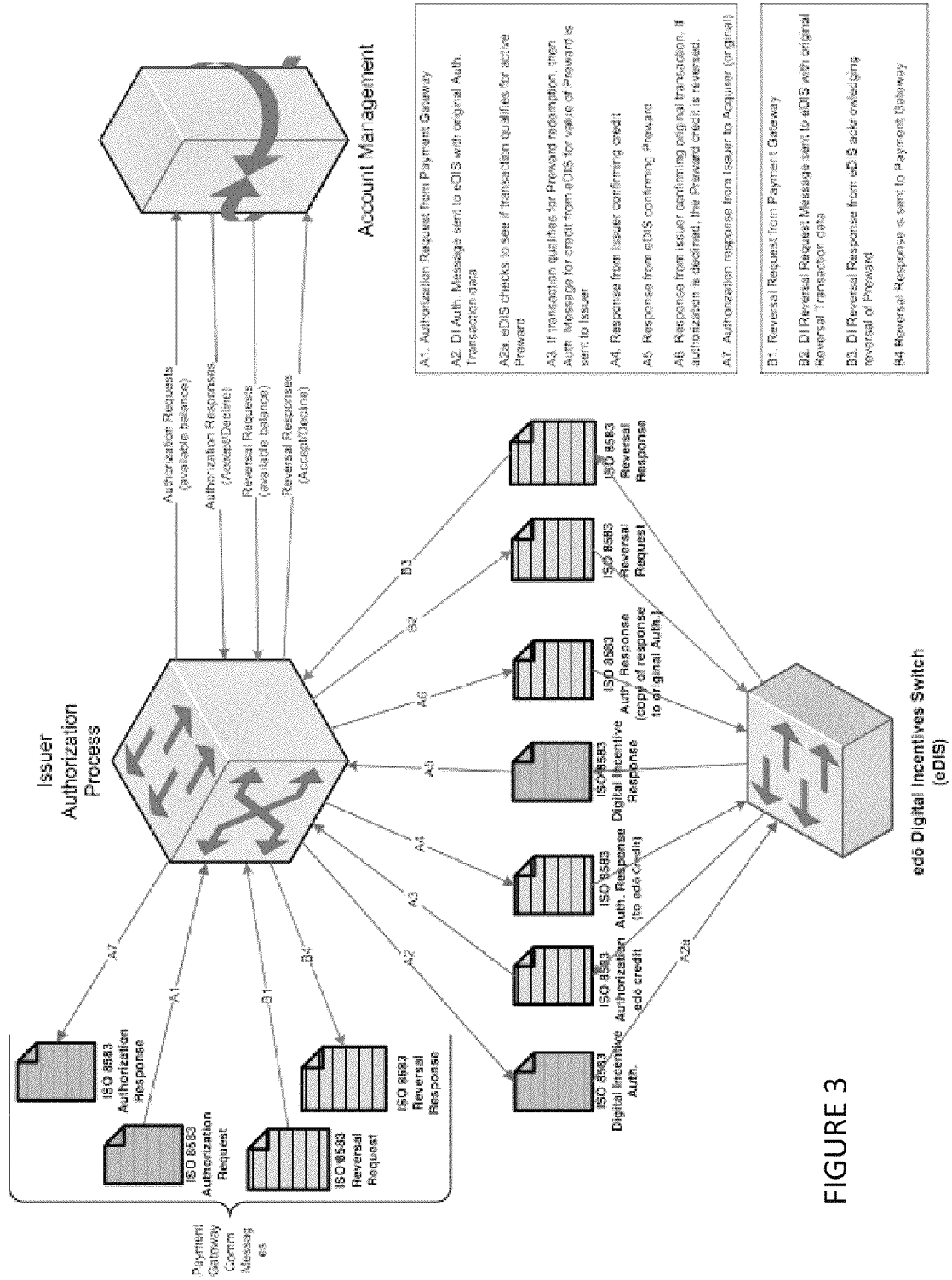
FIG. 3 illustrates a schematic diagram of the digital incentive system and switch processing for providing digital incentives of the present invention.

FIG. 3 illustrates a schematic diagram of the digital incentive system and switch processing for providing digital incentives of the present invention. It shows at its center an issuer authorization process box interacting with an accounts management box, for providing authorization requests (available balance), authorization responses (accept/decline), reversal requests (available balance), reversal responses (accept/decline), and combinations thereof; and the issuer authorization process box interacting with a payment gateway communication and/or messages output on the left of the diagram; and interacting with the digital incentives switch of the present invention, illustrated at the bottom of the diagram. The issuer authorization processor includes interactions of: (A1) providing an authorization request from the payment gateway; (A2) providing a digital incentive (DI) authorization message sent electronically via network to the digital incentives switch (DIS) with original authorization data; (A2a) the DIS automatically checks to confirm whether the transaction qualifies for a pre-award or "preward"; (A3) if the transaction qualifies for a preward redemption, then an authorization message for allowing a corresponding offset or credit to the user account (not the merchant level account or transaction) is automatically generated and transmitted from the DIS for the value of the preward; (A4) a response from the issuer authorization processor is provided confirming the offset or credit; (A5) providing a response from DIS confirming the preward authorization and application; alternatively, if not approved by the issuer authorization processor, then (A6) providing an electronic response automatically from the issuer authorization processor confirming the original transaction is declined, and either denying or reversing the preward allocation for offset (if previously authorized independently of the transaction or in advance of the transaction); and (A7) providing an authorization response from the issuer authorization processor to the acquiring entity via electronic communication on the network. Other payment gateway communication messaging includes (B1) providing a reversal request from the payment gateway to the issuer authorization processor via the network; (B2) sending a DI reversal request message to the DIS with reversal transaction data; (B3) providing a DI reversal response from the DIS acknowledging the reversal of the preward; and (B4) providing a reversal response to the payment gateway. Preferably, there is no communication regarding the preward between the DIS and the payment gateway directly, since the preward and DIS function do not directly affect merchant transactions.

Figure 4:
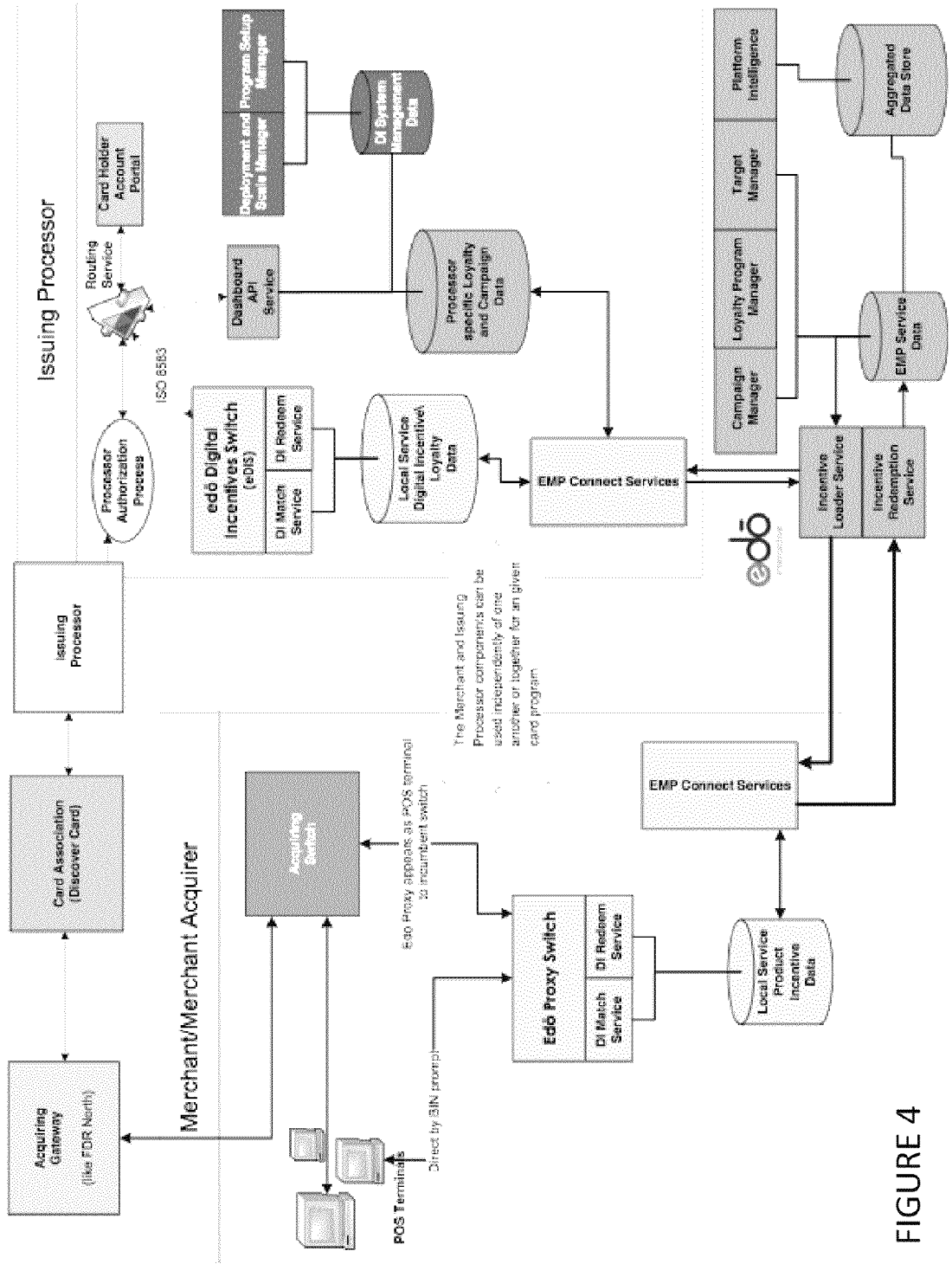
FIG. 4 illustrates another schematic and flow diagram of the digital incentive system and switch processing for providing digital incentives of the present invention.

As shown in FIG. 4, another schematic and flow diagram of the digital incentive switch and switch processing for providing digital incentives within the system and methods of the present invention are illustrated. In the embodiment shown, a proxy switch is provided within the network in digital electronic communication with a server having local service, product, and incentive data stored thereon, wherein the proxy switch appears as a point of sale (POS) terminal to the incumbent switch at the point of the acquiring switch within the network. The POS terminals are in communication with the proxy switch, indicated as direct by BIN prompt; the proxy switch provides for both a digital incentive (DI) match service and DI redeem service on the merchant/merchant acquirer context of the network and system of the present invention. The acquiring switch communicates bi-directionally (sending and receiving information and data) with the acquiring gateway as illustrated; likewise, the acquiring gateway is in communication via the network with the card association and issuing processor. On the right side of the diagram in FIG. 4, the issuing processor context is illustrated, including a processor authorization process and routing service in digital electronic communication over the network to the card holder account portal, which is preferably accessible in an electronic format including an interactive website having a graphic user interface that allows card holders to review information and make selections that are automatically linked with their accounts. The routing service is further in electronic digital communication to the electronic digital incentives switch (eDIS), which also has a DI match service and DI redeem service connected with a local service DI/loyalty data server and data thereon or associated therewith, and an EMP connect service that connects back to the merchant/merchant acquirer context of the system via the incentive loader service and incentive redemption service, which correspondingly connect with the DI campaign manager, loyalty program manager, target manager, and platform intelligence and with the EMP service data and aggregated data store. A second processor within the issuing processor side includes loyalty and campaign data that support an interactive dashboard API service that connects back to the routing service including a router. The DI system management data is also connected to the second processor and also with a deployment scale manager and program setup manager. All of these systems are preferably automated so that the transactions involving the digital incentives are seamlessly integrated with routing merchant activities and do not increase the time for processing of a sales transaction via credit card or digital payment, while providing for the digital incentives according to the present invention.

Figure 5:
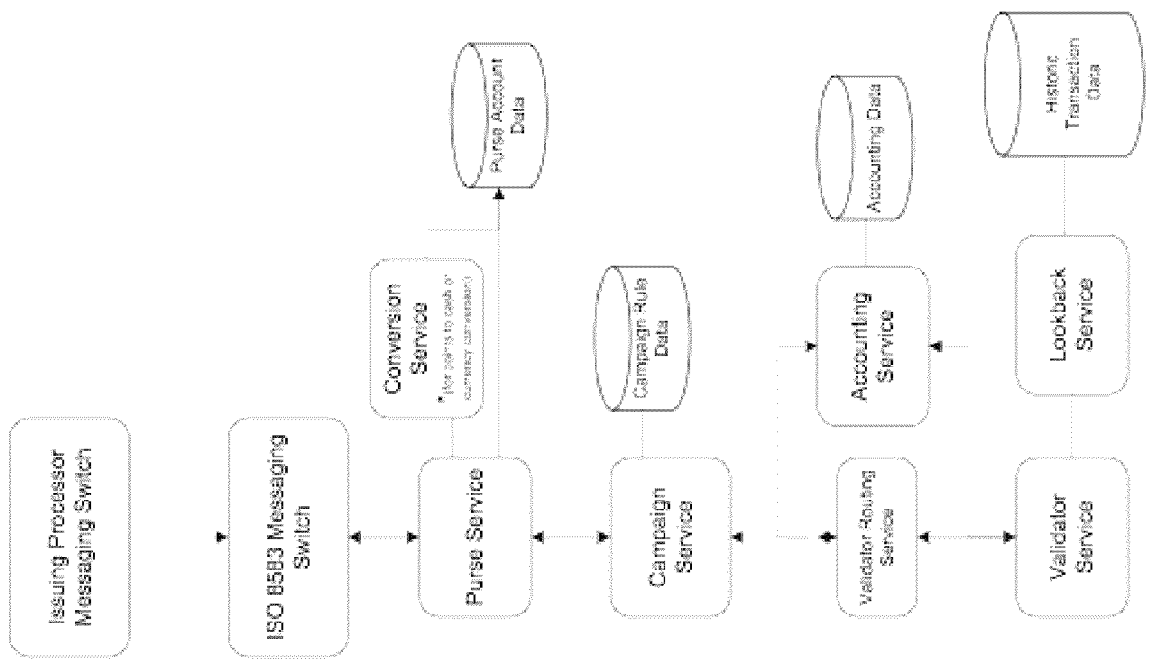
FIG. 5 illustrates a schematic diagram of the digital incentive system and switch processing for providing digital incentives of the present invention.

Referring now to FIG. 5, a schematic diagram of the digital incentive system and switch processing for providing digital incentives of the present invention is shown. FIG. 5 illustrates the method steps flow from issuing processor messaging switch to the ISO 8583 messaging switch to the purse services, which is connected to the conversion service and purse account data. Information and data flow between the purse service and campaign service (which is connected to or associated with a campaign rule data and database), which is in communication with an accounting service (and corresponding accounting data) and validator routing service that is in communication with the validator service, associated with a lookback service and historic transaction data.

As illustrated in the figures and the foregoing description, the present invention provides methods for offering and managing digital incentives as electronic financial offsets to a consumer or user's account, preferably a bank account that is independent from the merchant and wherein the methods do not operate to discount the merchant's receivable at the transaction and therefore do not function as a coupon or discount from the merchant's perspective at the transaction. Instead, the methods provide for matching consumer transactions with eligibility for credits or transaction offsets that are manifested as a credit to the consumer or user's bank account where a match exists within the system. Thus, the digital incentives have an electronic financial transaction value available for the redemption following the match at the electronic digital incentives switch (eDIS or DIS) on any electronic financial transaction media, and the redemption of the electronic financial transaction value of the digital incentive appears as a credit to the consumer or user account(s) associated with the matched digital incentives. With embodiments of the present invention, the consumer or user may be eligible for offered incentives based upon past transactions with businesses, retailers, and/or service providers, either directly in person and/or virtually as in online transactions: in this case, the system may automatically filter the consumer or user behavior compared with predetermined business, retail, or service providers that are offering digital incentives and that are registered within the system. Alternatively or additionally, specific products may be identified for eligibility for digital incentives. So then the consumer or user, either based upon historical behaviors or spending habits, or based upon selections or choices by the consumer or user in advance for future transactions that may be planned or desired within a predetermined timeframe and/or geography, the digital incentives are matched by the eDIS at the time of the next transaction by that user to determine if the transaction includes components of or overall is a qualifying or eligible transaction; if the eDIS determines a match, then the user's account is credited for the amount of the digital incentive at that time; if the eDIS determines that there is no match, then there is no credit. Therefore the present invention in this manner provides a loyalty consolidation wherein existing customer or consumer or user loyalty programs may use more general financial services systems without having to provide coupons, rewards after-the-fact for that particular transaction or other discounts that reduce the actual income on the merchant side of the transaction, as in the known prior art. By contrast, the present invention provides systems and methods that are independent of particular merchant transaction discounts, and provide for loyalty and incentives to motivate particular consumer actions for predetermined goods and services by providing a credit to the consumer directly that is triggered at the time of the actual transaction, without reducing the merchant income for that transaction directly.

Furthermore, an offline affiliate network and tracking of consumer behavior based upon tracking of the registered, authorized and/or redeemed electronic digital incentives provides for additional data that may be used for marketing, advertising, and for determination of future offerings for electronic digital incentives to the same or different consumers.

Other types of digital incentives structures may be provided, based on how the incentive is earned or redeemed following a match by the eDIS triggered by the consumer making a transaction with electronic payment method being rendered. By way of example and not limitation, the user may access the interactive website via the Internet or other network, and through the online system, select to sign up for a particular digital incentive(s) related to products, services, or particular businesses, retailers or service providers, or the user may have a particular digital incentive that is offered and he/she must opt-in to participate or accept the authorized digital incentive. In another alternative, the user may proactively access the interactive online website to a preward mall having a multiplicity of digital incentives that the user may select in advance of a planned transaction, based upon what the digital incentive is associated with and/or a particular geographic region where predetermined digital incentives are offered; corresponding advertising and/or marketing or market research may be included, wherein the user opts-in and agrees to provide electronic survey completion following the transaction or provide other feedback in exchange for the same or increased amount of digital incentive financial value. Following the selection by the user, the offers are downloaded to the user account and are immediately authorized for use by the user/consumer. Also, product manufacturers, merchants or service providers (or advertising agencies, market research organizations, and the like) may use the "preward mall" online to develop digital incentives for their offerings and to make them available to the consumer/user. They can proactively advertise or promote or email or otherwise electronically automatically transmit to predetermined users or users within the system who have a user profile that matches predetermined criteria based upon the merchant/seller/offeror's selections. In this manner, the digital incentives are provided in a push out method, and while not being a broadcast of the digital incentives, the offer for the digital incentive(s) goes to the user(s) who most likely want it, based on past performance or financial transaction history or online user profile within the system.

Another extension of the system and methods for matching electronic digital incentives includes the connection or association of prewards (or digital incentives) to a search engine. If the user is online running a search using predetermined search keywords, then relevant digital incentives are available as prewards and offered to the user online at the time of the search. The user may further opt-in for additional future advertising based upon the user's online behavior or profile within the system, and in compensation for that will receive authorized digital incentives.

Other embodiments or uses of the systems and methods set forth in the foregoing include digitized prewards within a prize pool. By way of example and not limitation, if a merchant/seller/offeror user wants to share or send a digital incentive or preward to a consumer user, e.g., $100 Preward, then functionally with the present system the merchant/seller/offeror, then it is automatically extended to the consumer user or pool or group of users that match the profile or characteristics selected or indicated by the merchant/seller/offeror. In prior art, rewards programs are extended to users based upon a total amount of spend by the user, often associated with a predetermined time period. The user is rewarded later with "points" of some unit measure that may be later redeemed through an online or offline fulfillment store, possibly for prepaid cards or discount coupons for future spend at predetermined merchants. However, by contrast to the prior art, where points are redeemed for prizes, and there is no opportunity at that reward redemption to spend additional money by the consumer (because the online or offline fullfilment store does not allow additional purchasing at that time—it merely exists to exchange rewards for discounts—the present invention provides for credits through digital incentives that are available immediately for use in the normal financial transactions, just as with cash or any other normal purchase by the consumer. The present invention offers a real-time adjustment as an offset or credit to the consumer user's account at the time a matching transaction is detected or determined, which is therefore trackable or connectable with the consumer user's purchasing behavior, thus additional market research, advertising and other data are available to offer customized digital incentive based upon a user profile created from that data. Another advantage of the present invention from any other reward system or discount/coupon system provided by the prior art is that the digital incentives and corresponding automatic electronic transaction to digital incentive matching system of the present invention provide for both online and offline activity by the consumer—the digital incentives are authorized for use online or in a store (physical store location). By contrast, prior art digital coupons are only useful for tracking online behavior, not for tracking both online and offline behavior by the consumer user. Also, the online "coupons" can be reproduced or defrauded; and hard copy coupons may similarly be copied and defrauded. Importantly, since the digital incentives matching of the systems and methods of the present invention are associated with a consumer user via their financial electronic payment means (credit or debit cards) they necessarily allow for Prewards or digital incentives use by that consumer user only, and are confirmed by the matching DIS (digital incentives switch) at the time of the electronic payment transaction authorization, through the network, as set forth hereinabove. Thus the present invention ties, links, connects or associates the Preward or digital incentive with online advertising and offline or online transaction activity by the consumer user. Additional information may also be used, such as tracking the timing from online advertising to actual use offline or online (timing data) as the time from acceptance of the digital incentive to redemption or use of the digital incentive by that particular customer user. This real-time information is valuable to advertising as the acceptance timing data can be used to adapt the campaign. With prior art, this used to be 8-day timing, which then doubled over 60 days, so then it can only be tested in 15 day periods—where it might take 45 days to judge acceptance rate. With the present invention, it is possible to assess the effectiveness of an advertising campaign in real time, since the digital incentives are matched in substantially real time by the DIS at the time of the transaction electronic payment processing. Thus, control and refinement are possible for advertising campaigns based upon data available based on customer user activity with the systems and methods of the present invention.

Again, as set forth in the foregoing, in the systems and methods of the present invention, the financial services transactions are electronic transactions and include debit, credit, and prepaid electronic payment cards, wireless digital electronic device transactions, and bank account transactions.

Referring now more particularly to the digital incentives switch, preferably it is operable for the steps of: matching the profile factors with the profile data for at least one user and applying the at least one digital incentive at the time a financial transaction in authorized by the financial platform; matching the profile factors with the profile data for at least one user and applying the at least one digital incentive independently of an authorization for the financial transaction by the issuing processor.

In methods of the present invention, preferably the step of applying the at least one digital incentive does not occur at a merchant level of the financial transactions, but provides a credit or offset for the transaction at the user account level, following the match by the digital incentives switch, such as by further including a step of providing an electronic digital credit associated with a positive match at the digital incentives switch, the credit applicable through any electronic financial transaction media. Thus, the step of applying the at least one digital incentive is activated at an issuing processor level within the financial platform following a positive match by the digital incentives switch. Other steps included with methods of the present invention may optionally include extracting data relating to the financial transaction at an issuing processor level within the financial platform, and providing a digital incentives user data database at an issuing processor level within the financial platform, further including storing information relating to the match of the profile factors and the profile data in the digital incentives user data database.

Preferably, the system and methods of the present invention further include providing an interactive user interface on a website operable for remote access by the at least one user to manage his/her digital incentives. Where an interactive website is available for online access by authorized users for accessing information about their respective digital incentives (either personal and/or associated with at least one user account), preferably the website provides information about the number and type of digital incentives available, previously applied or redeemed, and/or selectable for future use, for each of the at least one user.

Significantly, the present invention systems and methods provide digital incentives within a financial system relating to merchant level transactions for goods and/or services, wherein the digital incentives impact the user account as an offset or credit and preferably do not directly affect any aspect of the merchant level transaction, such as in the prior art discount or coupons, or as in the prepaid cards or advance rewards, wherein the merchant payment upon activation and use of the prepaid cards or advance rewards cards is a discounted payment, wherein the actual payment to the merchant is less than the retail transaction value for the payment for the goods and/or services at the time of purchase.

Certain modifications and improvements will occur to those skilled in the art upon a reading of the foregoing description. By way of example and not limitation, the methods described above may further include a step of providing real-time statistical modeling and analysis based on tracking and feedback associated with the application of the digital incentives. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

What is claimed is:

1. A method for issuing digital incentives for financial transaction credit as offset to a consumer user's financial account, comprising the steps of:

providing a server computer, a proxy switch located at a merchant point-of-sale (POS) device and at least one database in electronic, digital communication over a network, and readable code stored in a storage medium and executable by one or more processors; the readable code providing a financial platform operable on the server computer and on the proxy switch, the financial platform operable for financial services transactions between a merchant system and a financial services system;

the database comprising a database of profile data for at least one platform user;

the financial platform providing a platform user account for the at least one user;

providing a digital incentives issuing system for administering digital incentives for stimulating financial transactions by at least one user in advance of a purchase transaction with a pre-award, wherein the pre-award is a digital incentive that is automatically applied to a transaction allowing a corresponding offset or credit to the platform user account associated with the electronic payment for the transaction;

the digital incentive issuing system including profile factors for selecting recipients among consumer users and their corresponding profile data;

the digital incentive issuing system providing for at least a digital incentive (DI) match service and DI redeem service at the proxy switch and at the server;

a financial messaging switch presenting the digital incentive issuing system with financial data and non-financial message data;

and the digital incentives issuing system automatically comparing financial transaction data by the proxy switch and by the server with the digital incentive(s) and digital incentive rules for determining whether the transaction qualifies for the digital incentive to be associated with it;

if the transaction qualifies, then automatically applying at least one pre-award digital incentive to the platform user account of the at least one user, wherein the step of applying the pre-award digital incentive provides an electronic financial transaction value as a credit or financial offset to the platform user account;

and wherein the redemption of the pre-award digital incentive does not occur at a merchant level of the financial transaction.

2. The method of claim 1, further including the step of providing an electronic digital credit associated with a qualification of the transaction by the digital incentives issuing system, the credit applicable through any electronic financial transaction media.

3. The method of claim 1, wherein the digital incentive issuing system is operable for the steps of: matching a transaction and at least one pre-award digital incentive and applying the at least one pre-award digital incentive at the time a financial transaction is authorized by the financial platform to reduce the transaction charged to the user's platform account.

4. The method of claim 1, wherein the digital incentive issuing system is operable for the steps of: matching the transaction and available pre-award digital incentives by matching transaction profile factors with the transaction profile data and applying the at least one pre-award digital incentive independently of an authorization for the financial transaction by a issuing processor.

5. The method of claim 1, wherein the step of applying the at least one pre-award digital incentive is activated at an issuing processor level within the financial platform and reduces the total charged to the user's platform account.

6. The method of claim 1, further including the step of extracting data relating to the financial transaction at the issuing processor level within the financial platform.

7. The method of claim 6, further including the step of providing a digital incentives user data database at an issuing level within the financial platform.

8. The method of claim 7, further including the step of storing information relating to the match of the transaction profile factors and the profile data in the digital incentive user data database.

9. The method of claim 1, wherein the financial services transactions include debit, credit, and prepaid electronic payment cards, wireless digital electronic device transactions, and bank account transactions.

10. The method of claim 1, wherein the financial services transactions are electronic financial transactions.

11. The method of claim 1, further including the step of providing an interactive user interface on a website operable for access by the at least one user to manage his/her pre-award digital incentives.

12. The method of claim 11, wherein website provides information about the number and type of pre-award digital incentives available for each of the at least one user.

13. The method of claim 11, wherein website provides information about the number and type of pre-award digital incentives previously applied for each of the at least one user.

14. The method of claim 1, further including the step of providing real-time statistical modeling and analysis based on tracking and feedback associated with the application of the pre-award digital incentives.

15. A system for providing digital incentives comprising:
a server computer, a proxy switch located at a merchant point-of-sale (POS) device and at least one database in electronic, digital communication over a network, and a readable code stored in a storage medium and executable by one or more processors; the system providing a financial platform operable for financial services transactions to financial platform users;
the financial system interacting with a database of profile data for a multiplicity of financial platform users;
a pre-award digital incentive program operable within the financial system and on the proxy switch and the server computer for stimulating financial transactions by the financial platform user,
the pre-award digital incentive program including profile factors for matching with the profile data of the financial platform users and automatically providing at least one digital incentive to corresponding financial platform users,
the at least one pre-award digital incentive available for a use by each of the financial platform users after the server computer, comprising a pre-award digital incentive processor, and the proxy switch confirms a match;
the pre-award digital incentive has an electronic transaction value available for the use on any electronic financial transaction media, and
wherein the user of the electronic transaction value of the pre-award digital incentive does not occur at a merchant level of the financial transaction.

16. The system of claim 15, wherein the pre-award digital incentives processor is constructed and configured to determine whether a match exists between the profile factors and the profile data for at least one financial platform user, and operably to apply the at least one pre-award digital incentive at the time a financial transaction is authorized by the financial platform.

17. The system of claim 15, wherein the pre-award digital incentives processor is operable to determine whether the profile factors match the profile data for at least one financial platform user and to apply the at least one digital incentive independently of an authorization form the financial transaction by an issuing processor.

18. The system of claim 15, wherein the server computer transforms the financial transaction at a bank account level of each user, applying the financial transaction value available at the time of the financial transaction as a credit to each user.

19. The system of claim 15, wherein the system further includes user accounts that are accessible to an authorized set of selected users via an interactive user interface on a website.

* * * * *